United States Patent
Park

(10) Patent No.: US 12,485,756 B2
(45) Date of Patent: Dec. 2, 2025

(54) VEHICLE AND CONTROL METHOD THEREOF

(71) Applicants: Hyundai Motor Company, Seoul (KR); Kia Corporation, Seoul (KR)

(72) Inventor: Danghee Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 194 days.

(21) Appl. No.: 18/229,356

(22) Filed: Aug. 2, 2023

(65) Prior Publication Data

US 2024/0300328 A1    Sep. 12, 2024

(30) Foreign Application Priority Data

Mar. 9, 2023 (KR) .................. 10-2023-0030902

(51) Int. Cl.
| | |
|---|---|
| *B60K 35/29* | (2024.01) |
| *B60K 35/00* | (2024.01) |
| *G06V 20/59* | (2022.01) |
| *G06V 40/10* | (2022.01) |
| *G06V 40/20* | (2022.01) |
| *B60K 35/10* | (2024.01) |

(52) U.S. Cl.
CPC ............. *B60K 35/29* (2024.01); *G06V 20/59* (2022.01); *G06V 40/10* (2022.01); *G06V 40/28* (2022.01); *B60K 35/10* (2024.01); *B60K 2360/115* (2024.01); *B60K 2360/1464* (2024.01); *B60K 2360/148* (2024.01); *B60K 2360/191* (2024.01)

(58) Field of Classification Search
CPC ........ B60K 35/00; B60K 35/10; B60K 35/29; B60K 2360/115; B60K 2360/1464; B60K 2360/148; B60K 2360/191; B60K 35/22; B60K 2360/21; G06V 20/59; G06V 40/10; G06V 40/28; B60R 16/0373; G06F 3/017; G06F 3/16; B60Y 2400/92
See application file for complete search history.

(56) References Cited

U.S. PATENT DOCUMENTS

| | | | |
|---|---|---|---|
| 5,600,765 A | * | 2/1997 | Ando ...................... G06F 3/038 715/728 |
| 10,449,972 B2 | | 10/2019 | Truong |
| 2016/0025973 A1 | | 1/2016 | Guttag et al. |

(Continued)

FOREIGN PATENT DOCUMENTS

| | | |
|---|---|---|
| JP | H06-131437 A | 5/1994 |
| JP | 2015-133109 A | 7/2015 |

(Continued)

*Primary Examiner* — Richard M Camby

(74) *Attorney, Agent, or Firm* — Banner & Witcoff, Ltd.

(57) ABSTRACT

A vehicle may include: a microphone provided inside the vehicle and configured to receive a voice uttered by an occupant of the vehicle; a camera configured to obtain an image inside the vehicle; a display device configured to display a menu screen comprising a plurality of menu items; and a controller configured to control the display device. The controller may be configured to recognize, based on the image obtained via the camera, a hand gesture of the occupant, determine, based on the hand gesture, a menu item, of the plurality of menu items on the menu screen, pointed to by the occupant, and execute, based on the voice uttered by the occupant, a command corresponding to the pointed menu item.

20 Claims, 12 Drawing Sheets

(56) References Cited

U.S. PATENT DOCUMENTS

| | | | |
|---|---|---|---|
| 2018/0217810 A1* | 8/2018 | Agrawal | G10L 15/19 |
| 2019/0206403 A1* | 7/2019 | Jeong | G10L 15/22 |
| 2020/0219320 A1 | 7/2020 | Moniri et al. | |
| 2023/0252737 A1* | 8/2023 | Dreyer | G06F 3/017 |
| | | | 345/633 |
| 2024/0106905 A1* | 3/2024 | Josephson | H04L 67/306 |

FOREIGN PATENT DOCUMENTS

| | | |
|---|---|---|
| JP | 2017-531212 A | 10/2017 |
| KR | 101650769 B1 | 8/2016 |
| KR | 2017-0061453 A | 6/2017 |

\* cited by examiner

VEHICLE AND CONTROL METHOD THEREOF

CROSS-REFERENCE TO RELATED APPLICATION

This application is based on and claims priority to Korean Patent Application No. 10-2023-0030902, filed on Mar. 9, 2023 in the Korean Intellectual Property Office, the disclosure of which is incorporated herein by reference.

TECHNICAL FIELD

The disclosure relates to a vehicle and a control method thereof that may control various functions of the vehicle according to a command input by an occupant of the vehicle.

BACKGROUND

Touch input from an occupant to a physically fixed hardware (e.g., a touchscreen) may allow a desired screen to be displayed and a desired command to be entered for changes to vehicle's interior environment and convenience. However, since a touch input may cause distracted driving that can result in an accident, a touch-based user interface may be less useful in vehicles.

Recently, vehicles are equipped with a speech recognition device capable of controlling a vehicle simply by a user's speech, thereby improving an in-vehicle input interface. However, noise inside and outside a vehicle can hinder or prevent a driver's voice from being accurately recognized and converting complex speech to text has limitations, sometimes necessitating the occupants to repeat the command over and over again.

In addition, even in a vehicle using motion recognition, a time delay occurs when using a motion recognition-based operation, and thus an immediate response may not be obtained, and thus may be in less usefulness in vehicles.

SUMMARY

The present disclosure provides a vehicle and a control method thereof that may use a hybrid interface method combining hand motion recognition and voice recognition based on a hand gesture and voice of an occupant of the vehicle, thereby performing a function desired by the occupant quickly and accurately.

Additional aspects of the disclosure will be set forth in part in the description which follows and, in part, will be obvious from the description, or may be learned by practice of the disclosure.

According to one or more example embodiments of the present disclosure, a vehicle may include: a microphone provided inside the vehicle and configured to receive a voice uttered by an occupant of the vehicle; a camera configured to obtain an image inside the vehicle; a display device configured to display a menu screen comprising a plurality of menu items; and a controller configured to control the display device. The controller may be further configured to: recognize, based on the image obtained via the camera, a hand gesture of the occupant; determine, based on the hand gesture, a menu item, of the plurality of menu items on the menu screen, pointed to by the occupant; and execute, based on the voice uttered by the occupant, a command corresponding to the pointed menu item.

The display device may include at least one of: a display provided inside the vehicle and configured to display the menu screen, or an image projector configured to project the menu screen onto a space or an interior surface in the vehicle.

The controller may be further configured to, based on a determination that the hand gesture is a screen display motion for displaying the menu screen, control the display device to display the menu screen.

The controller may be configured to determine the menu item by: determining a position, on the menu screen, that is pointed to by the hand gesture; and determining the menu item, among the plurality of menu items, based on the determined position.

The controller may be configured to determine the position by: estimating a skeletal structure of a hand of the occupant by applying feature points of the hand of the occupant to a skeletal model; and determining the position based on the estimated skeletal structure of the hand of the occupant.

The controller may be configured to determine the position by: generating an extension line extending from a fingertip of the occupant to the menu screen based on the estimated skeletal structure of the hand of the occupant; and determining the position further based on an intersection between the extension line and a plane on which the menu screen is located.

The controller may be further configured to enlarge or highlight the menu item, pointed to by the occupant, relative to other menu items of the plurality of menu items.

The controller may be further configured to, based on the menu item being enlarged or highlighted, activate the microphone.

The microphone may include: a first microphone configured to receive a first voice signal inside the vehicle; and a second microphone directed at the occupant to receive a second voice signal associated with the occupant.

The controller may be configured to execute the command by: executing the command based on a sound pressure level difference, between the first voice signal received via the first microphone and the second voice signal received via the second microphone, being greater than a threshold sound pressure level.

The microphone may include a single microphone. The controller may be configured to execute the command based on at least one of: a sound pressure level difference, between a first voice signal corresponding to the voice uttered by the occupant and a second voice signal received before the occupant utters the voice, being greater than a threshold sound pressure level, or an amplitude difference, between the first voice signal corresponding to the voice uttered by the occupant and the second voice signal received before the occupant utters the voice, being greater than a threshold amplitude.

According to one or more example embodiments of the present disclosure, a method may include: obtaining an image inside a vehicle; recognizing, based on the image, a hand gesture of an occupant of the vehicle; determining, based on the hand gesture, a menu item, of a plurality of menu items on a menu screen displayed on a display device of the vehicle, pointed to by the occupant; receiving a voice uttered by the occupant; and executing, based on the voice, a command corresponding to the pointed menu item.

The method may further include causing the display device to perform at least one of: displaying the menu screen on a display provided in the vehicle, or displaying the menu screen onto a space in the vehicle through an image projector provided in the vehicle.

The method may further include, based on a determination that the hand gesture is a screen display motion for displaying the menu screen, controlling the display device to display the menu screen.

Determining of the menu item may include: determining a position, on the menu screen, that is pointed to by the hand gesture; and determining the menu item, among the plurality of menu items, based on the determined position.

Determining of the position may include estimating a skeletal structure of a hand of the occupant by applying feature points of the hand of the occupant to a skeletal model; and determining the position based on the estimated skeletal structure of the hand of the occupant.

Determining of the position may include: generating an extension line extending from a fingertip of the occupant to the menu screen based on the estimated skeletal structure of the hand of the occupant; and determining the position further based on an intersection between the extension line and a plane on which the menu screen is located.

The method may further include enlarging or highlighting the menu item, pointed to by the occupant, relative to other menu items of the plurality of menu items.

The method may further include, based on the menu item being enlarged or highlighted, activating a microphone in the vehicle.

Receiving of the voice uttered by the occupant may include: receiving a first voice signal inside the vehicle via a first microphone; and receiving a second voice signal associated with the occupant via a second microphone directed at the occupant. Executing of the command may include executing the command based on a sound pressure level difference, between the first voice signal received via the first microphone and the second voice signal received via the second microphone, being greater than a threshold sound pressure level.

Executing of the command may include executing the command based on at least one of: a sound pressure level difference, between a first voice signal corresponding to the voice uttered by the occupant and a second voice signal received before the occupant utters the voice, being greater than a threshold sound pressure level, or an amplitude difference, between the first voice signal corresponding to the voice uttered by the occupant and the second voice signal received before the occupant utters the voice, being greater than a threshold amplitude.

BRIEF DESCRIPTION OF THE DRAWINGS

These and/or other aspects of the disclosure will become apparent and more readily appreciated from the following description of one or more example embodiments, taken in conjunction with the accompanying drawings of which.

DETAILED DESCRIPTION

Figure 1:
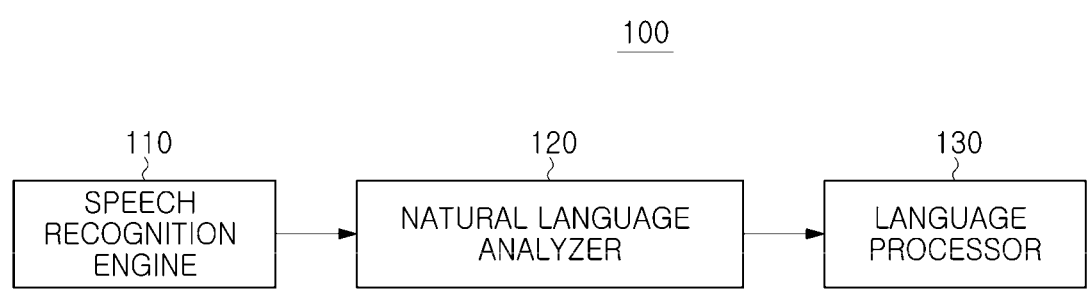
FIG. 1 is a block diagram illustrating a speech recognition device connected to a vehicle.

Like reference numerals throughout the specification denote like elements. Also, this specification does not describe all the elements according to one or more example embodiments of the disclosure, and descriptions well-known in the art to which the disclosure pertains or overlapped portions are omitted. The terms such as "~part", "~member", "~module", "~device", and the like may refer to at least one process processed by at least one hardware or software. According to one or more example embodiments, a plurality of "~parts", "~members", "~modules", "~devices" may be embodied as a single element, or a single of a "~part", "~member", "~module", "~device" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a block diagram illustrating a speech recognition device connected to a vehicle.

Referring to FIG. 1, a speech recognition device 100 connected to a vehicle is capable of processing a voice command input to the vehicle, and may be embedded in the vehicle, or may be provided in a separate server and connected to the vehicle via a wireless communication network. One or more of the elements shown in FIG. 1 may be implemented with hardware (e.g., one or more processors, memory, etc.), software, or a combination of both. Two or more of the elements shown in FIG. 1 may be combined into one device.

The speech recognition device 100 includes a speech recognition engine (also referred to as a speech recognition module) 110 converting a user's speech into text, a natural language analyzer (also referred to as a natural language understanding module) 120 determining a user intention corresponding to the text, and a language processor (also referred to as a result processing module) 130 generating various result processing signals required to provide a service according to the user intention.

The speech recognition engine 110 may be implemented with a speech to text (STT) engine, and perform conversion into text by applying a speech recognition algorithm to the user's speech.

For example, the speech recognition engine 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition engine 110 may convert the user's speech into text based on learning where deep learning or machine learning is applied. A way of converting the user's speech into the text by the speech recognition engine 110 is not limited thereto, and a variety of speech recognition techniques may be applied to convert the user's speech into the text.

The natural language analyzer 120 may apply a natural language understanding (NLU) technique to determine a user intention included in the text. Accordingly, the natural language analyzer 120 may include an NLU engine capable of determining the user intention by applying the NLU technique to an input sentence. Here, the text output by the speech recognition engine 110 may be an input sentence that is input to the natural language analyzer 120.

For example, the natural language analyzer 120 may recognize an entity from the input sentence. The entity is a proper noun such as a name of an individual person, place, organization, time, day, currency, and the like. Named-entity recognition (NER) may identify an entity in a sentence and classifying a type of the identified entity. A keyword may be extracted from a sentence through named-entity recognition to understand the meaning of the sentence.

Also, the natural language analyzer 120 may determine a domain from the input sentence. The domain may identify a subject matter of the user's speech. For example, domains representing various subject matters such as a vehicle control, schedule, information about weather or traffic conditions, text transmission, navigation, etc., may be determined based on the input sentence.

The natural language analyzer 120 may also analyze a speech act of the input sentence. The speech act analysis is for analyzing a user intention such as whether the user's speech intends to ask a question, make a request, make a response, express a feeling, or the like.

The natural language analyzer 120 may determine an intent and an entity required to perform the intent based on the domain, entity name, speech act extracted from the input sentence. For example, when the input sentence is "turn on the air conditioner", the domain may be a [vehicle control], the intent may be [turn on, air conditioner]. Here, [turn on] may be the action, and [air conditioner] may be the target, the entity required to perform control corresponding to such intent may be [temperature, air volume].

The language processor 130 may output a result processing signal to a user terminal or an external server to provide a service corresponding to the user intention.

The user terminal may serve as a gateway between a user and the speech recognition device 100. The user terminal may be a mobile device provided with an input/output interface such as a microphone, a speaker, a display, and the like, or be a vehicle itself. When the user terminal is a mobile device, the vehicle and the mobile device may be connected to each other via wireless communication such as Bluetooth, or a cable connection.

For example, when a service corresponding to the user intention is a vehicle-related control, a control signal for performing the corresponding control may be generated and transmitted to the user terminal.

Alternatively, when a service corresponding to the user intention is provision of specific information, the language processor 130 may search for the specific information and transmit the retrieved information to the user terminal. Information retrieval may be performed by an external server, when required.

Alternatively, when a service corresponding to the user intention is provision of specific content, the language processor 130 may request the content from an external server providing the corresponding content.

Alternatively, when a service corresponding to the user intention is simply continuation of a dialogue, the language processor 130 may generate a response to the user's speech and output the response as a voice.

The speech recognition device 100 described above may be implemented with at least one memory storing a program performing the aforementioned operations and at least one processor implementing a stored program.

The constituent components of the speech recognition device 100 are divided based on their operation or function, and all or a portion of the constituent components may share the memory or processor. That is, the speech recognition engine 110, the natural language analyzer 120, and the language processor 130 are not necessarily physically separated from each other.

Figure 2:
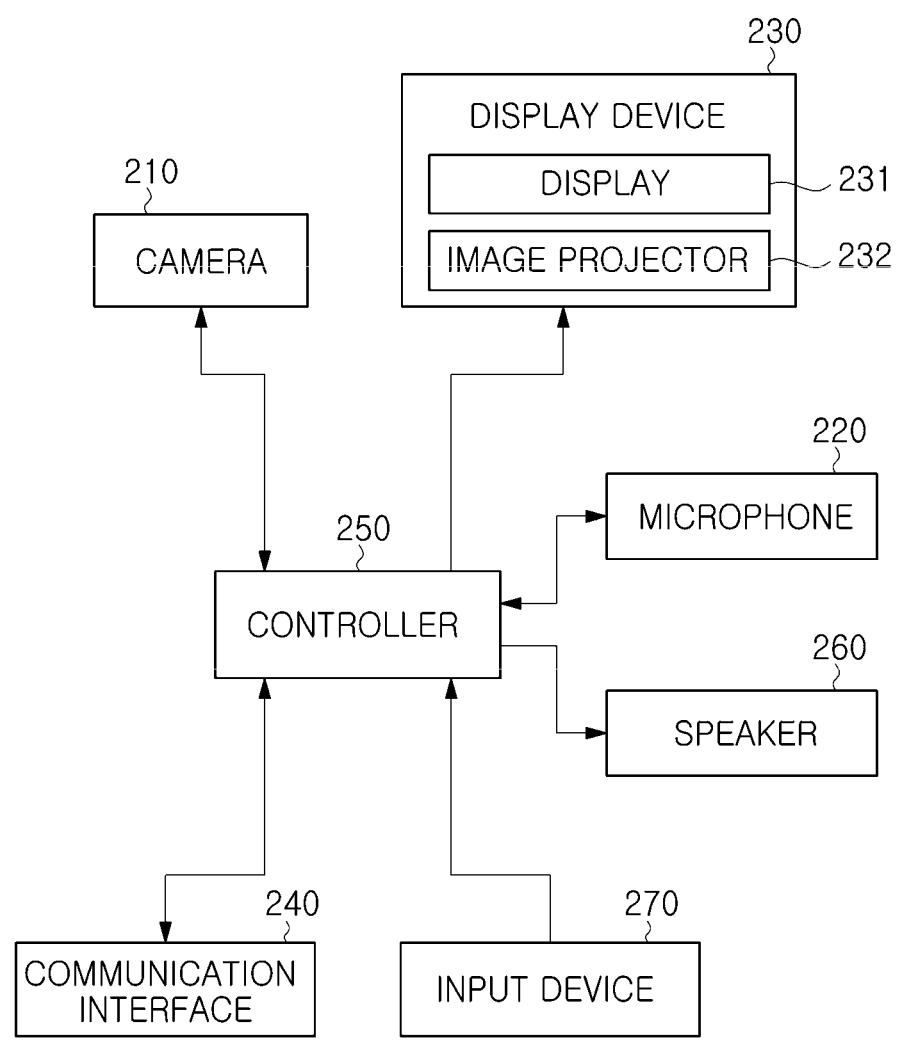
FIG. 2 is a block diagram illustrating a vehicle.
Figure 3:
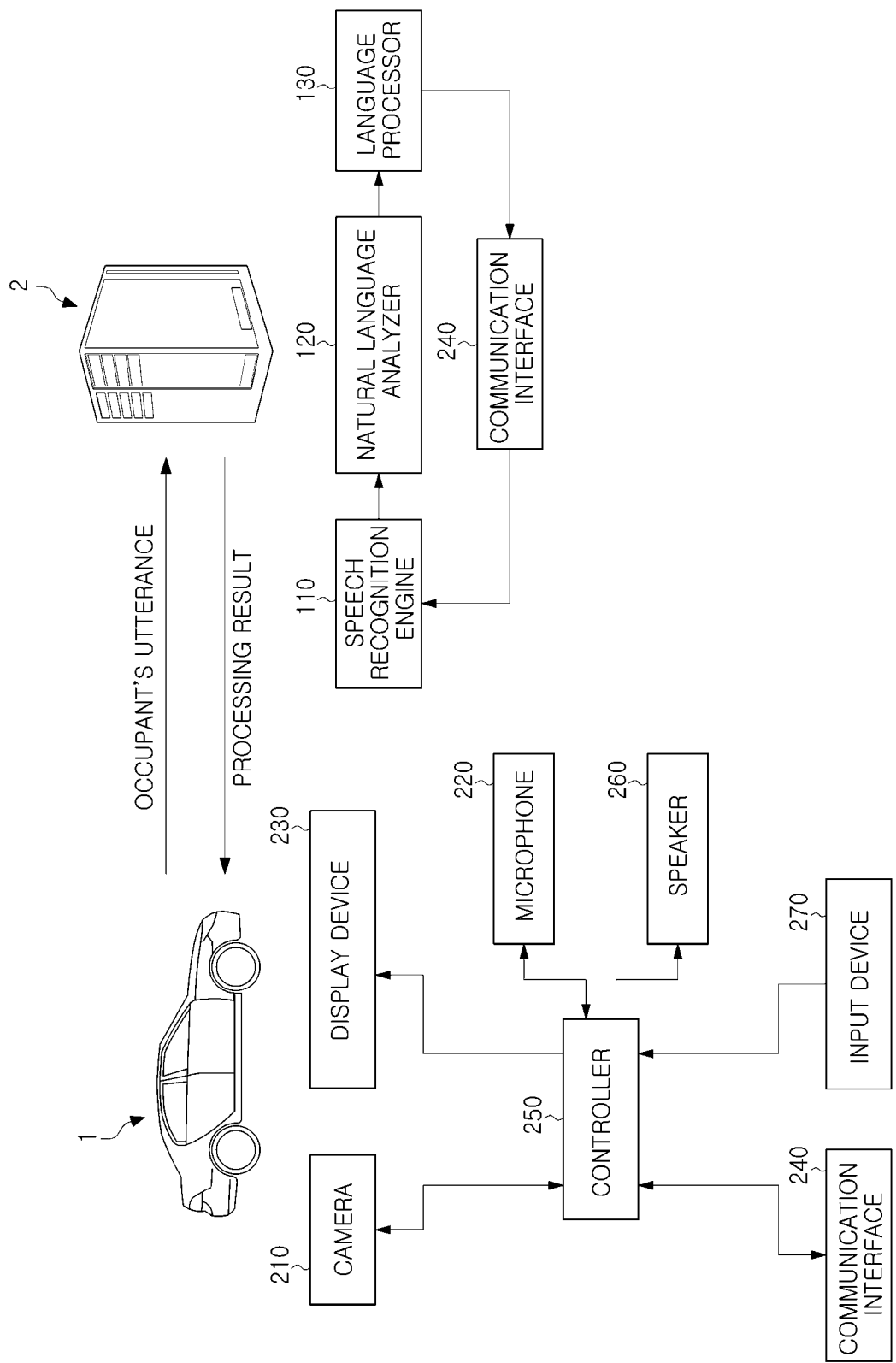
FIG. 3 is a diagram briefly illustrating a relationship between a speech recognition device and a vehicle.

FIG. 2 is a block diagram illustrating a vehicle. FIG. 3 is a diagram briefly illustrating a relationship between a speech recognition device and a vehicle.

Referring to FIG. 2, a vehicle 1 may be an autonomous vehicle capable of autonomously driving to a destination without a driver's specific operation. Accordingly, the vehicle 1 may not necessarily include a driver's seat arranged for an occupant to look forward. Seats inside the vehicle 1 may be arranged to allow occupants to have different viewing directions.

The vehicle 1 includes a camera 210 photographing an image inside the vehicle 1, a microphone 220 to which a user's speech is input, an image display device 230 displaying an image required to provide a service desired by a user, a speaker 260 outputting a sound required to provide a service desired by the user, a communication interface (also referred to as a communication module) 240 communicating with an external device, and a controller 250 controlling the above-described constituent components and other constituent components of the vehicle 1.

The camera 210 may obtain image data obtained by photographing an interior of the vehicle 1. For example, the camera 10 may be installed near a ceiling of the vehicle 1 and may be a camera having a field of view toward the interior of the vehicle 1. The image data may include information of an occupant in the vehicle 1.

The camera 10 may include a plurality of lenses and image sensors. The image sensor may include a plurality of photodiodes converting light into an electrical signal, and the plurality of photodiodes may be arranged in a two-dimensional (2D) matrix.

The camera 10 may be an in-cabin camera mounted inside the vehicle 1 for confirming a state of the occupant in real time.

The microphone 220 may be provided inside the vehicle 1 to receive a user's speech. The user may be a driver or an occupant. The microphone 220 may be provided on a steering wheel, a center fascia, a headliner, or a rear-view mirror, etc., to receive a speech from the driver or a front occupant.

Also, two or more microphones 220 may be provided to receive a rear occupant's speech. The microphone 220 for receiving the rear occupant's speech may be provided on a front armrest, a rear armrest, rear doors, B pillar or C pillar.

The above-described positions of the microphone 220 may be applicable to the vehicle 1. The microphone 220 may be provided anywhere, as long as it may receive a speech from users in each location.

The vehicle 1 may also include an input device 270 for manually receiving a user command in addition to the microphone 220. The input device 270 may include an input device in an area where an audio, video, navigation (AVN) is provided on a center fascia, in an area where a gearbox is provided, or on a steering wheel as a jog shuttle or a button. Also, to receive a control command related to occupant seats, the input device 270 may include an input device provided on each door of the vehicle 1, and an input device provided on a front armrest or a rear armrest.

Further, the input device 270 may include a touchpad like a touchscreen by being provided integrally with the image display device 230.

The image display device 230 may display various information about the vehicle, and display a menu screen where a plurality of menus for vehicle control are displayed.

The communication interface 240 may transmit and receive information with other devices by using at least one of various wireless communication methods such as Bluetooth, 4G, 5G, Wi-Fi, and the like. Alternatively, the interface module 240 may transmit and receive information with other devices through a cable connected to a USB terminal, an AUX terminal, and the like.

For example, the communication interface 240 may communicate with a mobile device located in the vehicle 1, thereby receiving information (user images, user speech, contact numbers, schedules, etc.) obtained by or stored in the mobile device. Also, the communication interface 240 may communicate with a server 1, thereby transmitting a user's speech and receiving a signal required to provide a service desired by the user. In addition, the communication interface 240 may transmit and receive a signal with the server 1 through a mobile device connected to the vehicle 1.

Further, the vehicle 1 may include an air conditioning device 281 for adjusting an indoor temperature of the vehicle 1, a window adjustment device 282 for opening/closing vehicle windows, a seat heating device 283 for heating seats, a seat adjustment device 284 for adjusting a position, height, or angle of a seat, and a lighting device 285 for adjusting an indoor illuminance level.

The aforementioned devices are for providing convenience functions related to the vehicle 1, and a portion of the devices may be omitted depending on models or options.

Also, other devices may be further included in the vehicle 1 in addition to the above devices.

The controller 250 may turn on or off the camera 210 or the microphone 220, and process, store, or transmit an image photographed by the camera 210 or a voice input to the microphone 220 to another device via the communication interface 240.

The controller 250 may also control the image display device 230 to display an image, or control the speaker 260 to output a sound.

In addition, the controller 250 may perform various control related to the vehicle 1. For example, the controller 250 may control at least one of the air conditioning device 281, the window adjustment device 282, the seat heating device 283, the seat adjustment device 284, or the lighting device 285 according to a user command input through the input device 270 or the microphone 220.

The controller 250 may include at least one memory storing a program performing the aforementioned operations and operations to be described later, and at least one processor implementing a stored program.

Referring to FIG. 3, the speech recognition device 100 may be provided in the server 1. Accordingly, a user's speech input to the vehicle 1 may be transmitted to a communication interface 140 of the server 1. When a voice signal is processed by the speech recognition device 100 provided in the server 1, the communication interface 140 may transmit a processing result to the vehicle 1 again.

Alternatively, a portion of the constituent components of the speech recognition device 100 may be provided in the vehicle 1, and the other constituent components may be provided in the server 1.

For example, the speech recognition engine 110 may be provided in the vehicle 1, and the natural language analyzer 120 and the language processor 130 may be provided in the server 1.

As another example, the speech recognition engine 110 and the language processor 130 may be provided in the vehicle 1, and the natural language analyzer 120 may be provided in the server 1, and the speech recognition engine 110 and natural language analyzer 120 may be provided in the server 1, and the language processor 130 may be provided in the vehicle 1.

As still another example, the speech recognition device 100 may be provided in the vehicle 1.

Although all or a portion of the constituent components of the speech recognition device 100 may be provided in the vehicle 1 as described above, an example where the speech recognition device 100 is provided in the server 1, as shown in FIG. 3.

The image display device 230 requires only to be positioned to be viewable by a user in the vehicle 1, and the number or location of the image display device 230 is not limited.

The image display device 230 may include a display 231 and an image projector 232.

Figure 4:
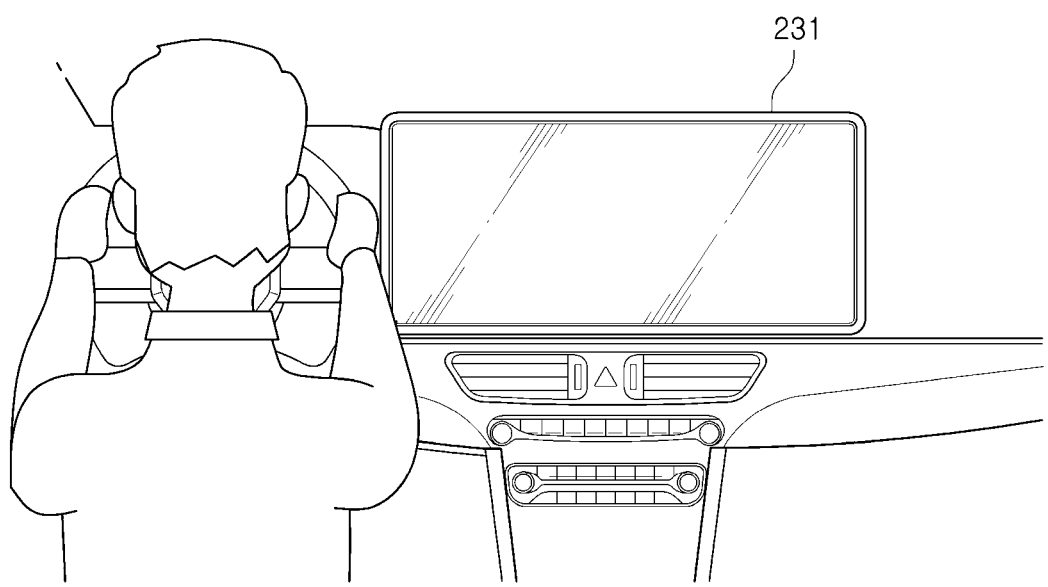
FIG. 4 is a diagram illustrating an image display device which is a display provided on a center fascia in a vehicle.

FIG. 4 is a diagram illustrating an image display device which is a display provided on a center fascia in a vehicle.

Referring to FIG. 4, the display 231 may include an audio, video, navigation (AVN) display provided on a center fascia of the vehicle 1, a cluster display, or a head-up display (HUD). Alternatively, the display 231 may include a rear seat display provided on a back of the front seat's headrest so that a rear occupant may see the rear seat display. When the vehicle is a multi-seater vehicle, the display 231 may include a display mounted on a headliner of the vehicle.

Figure 5:
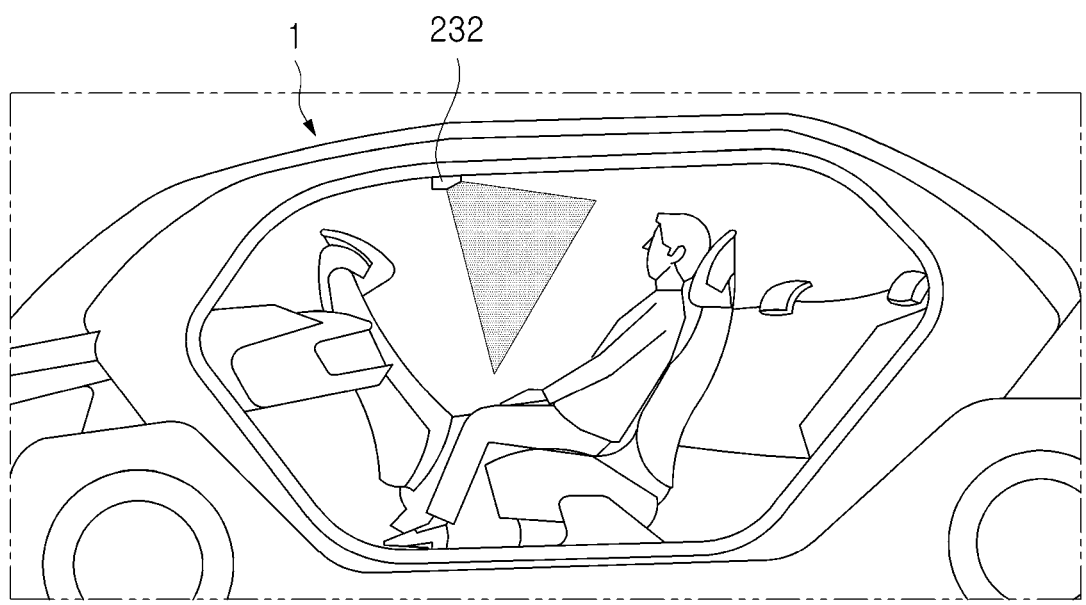
FIG. 5 is a diagram illustrating an image display device which is an image projector in a vehicle.

FIG. 5 is a diagram illustrating an image display device which is an image projector in a vehicle.

Referring to FIG. 5, the image projector 232 may project a projection image onto an interior of the vehicle 1. The projection image may be displayed on the interior so that an occupant may visually recognize the projection image. For example, the image projector 232 may be installed near a ceiling of the vehicle 1 and project the projection image onto a space or a surface (e.g., a wall, a console, etc.) in front of the occupant.

The projection image may include a menu screen including a plurality of menus for controlling the vehicle. In the menu screen, the plurality of menus may include information such as 2D or three-dimensional (3D) characters or pictures.

The image projector 232 may include a holographic device displaying 3D holograms with the projection image or an image device displaying a light emitting diode (LED) image. Also, the image projector 232 may include a transparent display unit that is movable as required.

Level 4 autonomous driving does not require human intervention, because driving is controlled under specified conditions. In Level 4 autonomous driving, a driver will disappear, and an occupant will be able to ride in the vehicle in various ways. In such a driving environment, an occupant may require use of various vehicle controls to change an interior environment and for convenience. That is, because an existing, physically fixed display device is no longer essential, a more flexible display without space constraints is required. Accordingly, by projecting and reproducing the projection image in a 3D space through the image projector 232, a space of a cabin may be maximized, and an environment that may effectively respond to various in-cabin conditions may be realized even in multi-product, low-volume mobility production environments.

Figure 6:
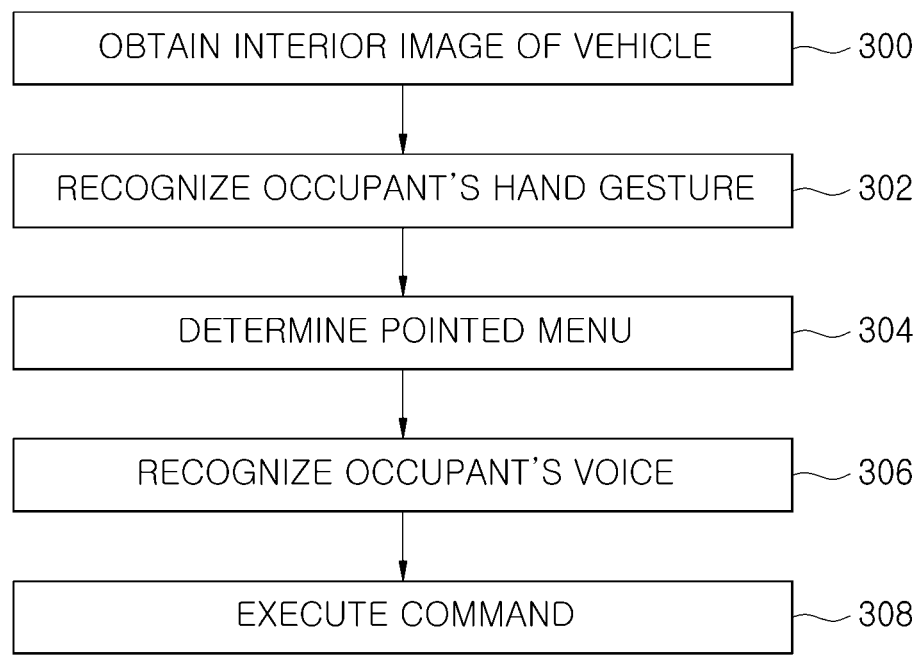
FIG. 6 is a flowchart illustrating a control method of a vehicle.

FIG. 6 is a flowchart illustrating a control method of a vehicle.

Referring to FIG. 6, the controller 250 may obtain an image inside the vehicle 1 through the camera 210 (300).

The controller 250 may recognize a hand motion (e.g., a hand gesture) of an occupant by analyzing the image obtained from the camera 210 (302).

The controller 250 may determine a pointing menu pointed to by a hand of the occupant from among a plurality of menus displayed on a menu screen based on the occupant's hand motion (304).

The controller 250 may recognize a voice of the occupant received through the microphone 220 (306).

The controller 250 may execute a command corresponding to the pointed menu according to the occupant's voice (308).

As described above, in terms of voice recognition (speech recognition), noise cancelling is required to remove various noises of the vehicle, and thus voice recognition is complicated and takes a lot of time. In terms of motion recognition, despite fast recognition, a separate gesture is required or time delay occurs when a specific menu is executed.

However, the vehicle 1 may use a hybrid interface method that combines hand motion recognition and voice recognition, thereby overcoming limitations of interface technology based only on voice recognition or only motion recognition, and quickly and accurately performing functions desired by the occupant. That is, the vehicle 1 may determine the pointing menu pointed by the occupant's hand on the menu screen using motion recognition of the occupant's hand, and execute the pointing menu using voice recognition of the occupant's voice, and thus a process for executing the menu may be replaced by a simple voice instead of a specific gesture, while ensuring fast response of motion recognition and convenience of voice recognition. Accordingly, time delay may be reduced.

Hereinafter, a vehicle where a stereo microphone is applied is described.

Figure 7:
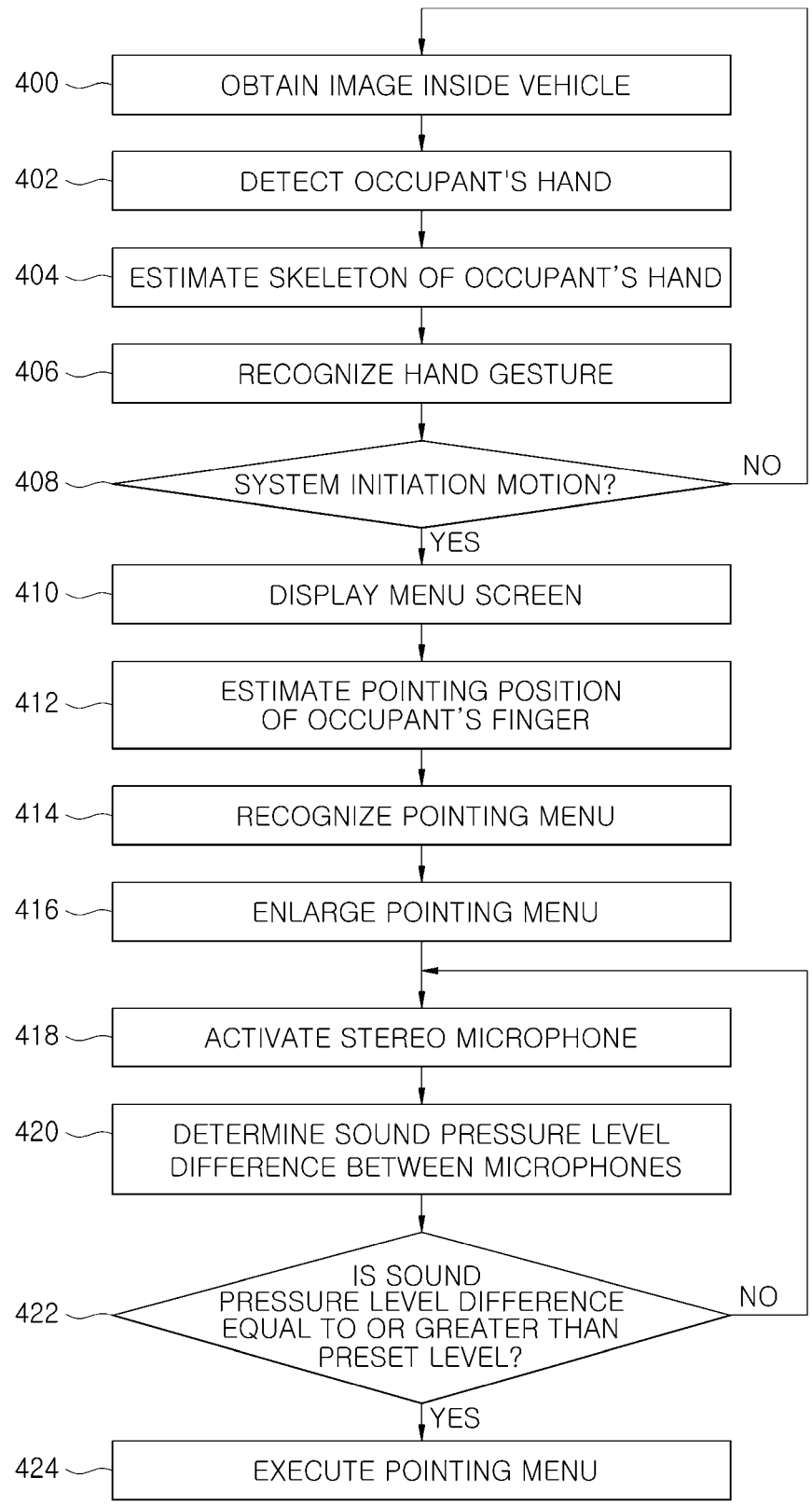
FIG. 7 is a flowchart specifically illustrating operations of performing hand motion recognition and voice recognition in a vehicle.

FIG. 7 is a flowchart specifically illustrating operations of performing hand motion recognition and voice recognition in a vehicle.

Referring to FIG. 7, the controller 250 may obtain an image inside the vehicle 1 via the camera 210 (400).

The controller 250 may detect an occupant's hand in the image obtained by the camera 210 (402).

The controller 250 may detect an occupant region in the image obtained from the camera 210, and extract a hand region from the occupant region in real time. The controller 250 may extract the hand region by detecting a boundary between the hand region and a background region in the occupant region.

The controller 250 may detect feature points of the hand region from the extracted hand region. Based on the detected feature points, a hand shape of the occupant may be recognized.

The controller 250 may estimate a skeleton (e.g., an internal skeletal structure) of the occupant's hand (404).

Figure 8:
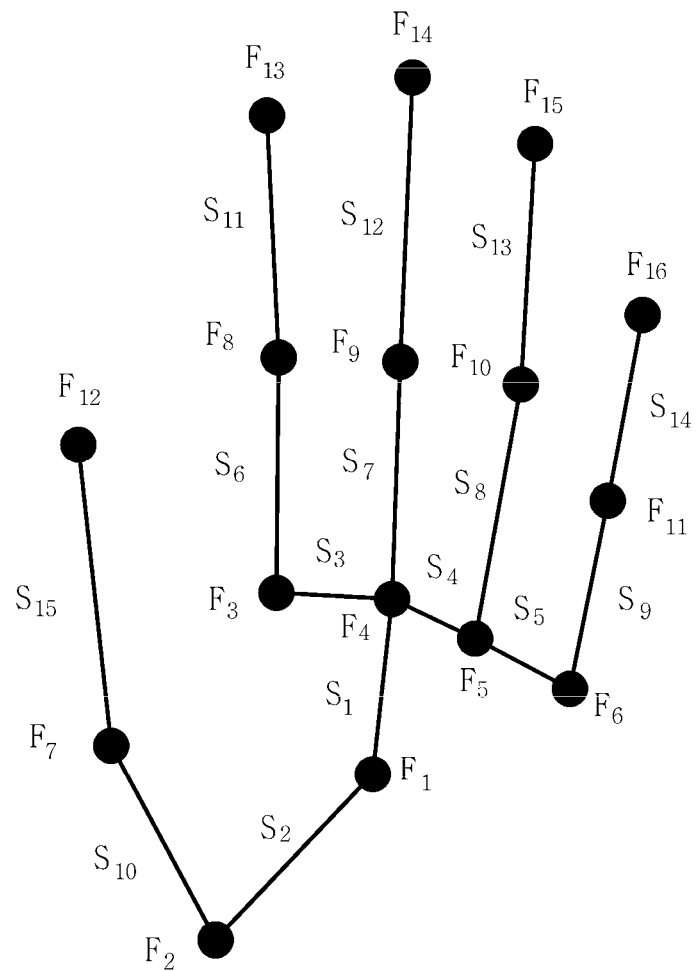
FIG. 8 is a diagram illustrating a skeleton model of fingers of an occupant of a vehicle.

FIG. 8 is a diagram illustrating a skeleton model of fingers of an occupant of a vehicle.

Referring to FIG. 8, feature points used in a skeleton model are 16 feature points from F1 to F16, and a distance between each feature point is represented by S1 to S15.

F2, F7, and F12 represent feature points for thumb joints. F3, F8, and F13 represent feature points for index finger joints. F4, F9, and F14 represent feature points for middle finger joints. F5, F10, and F15 represent feature points for ring finger joints. F6, F11, and F16 represent feature points for little finger joints. F1 represents a feature point for a palm.

The controller 250 may estimate a skeleton of the occupant's hand by applying feature points of the hand region of the occupant to the skeleton model (also referred to as a skeletal model). That is, the skeleton of the occupant's hand may be estimated by mapping the feature points corresponding to fingertips of the occupant to the skeleton.

For example, the controller 250 may estimate the skeleton of the occupant's hand, by matching each joint and knuckle of the finger by applying the skeleton model to the feature points corresponding to the occupant's fingertips.

Referring again to FIG. 7, the controller 250 may recognize a hand motion of the occupant (406).

The controller 250 may recognize the occupant's hand motion from changes in joint angle and knuckle length in the skeleton of the occupant's hand.

For example, the controller 250 may recognize that the occupant extends a single finger. In this case, a change in motion from a first motion to a second motion may be recognized, i.e., a change in hand motion from a clenched first to a single finger extension motion may be recognized.

Although it has been illustrated that the hand skeleton is used to recognize a hand motion, hand motion recognition may also be performed in a manner that recognizes a gesture from feature points of the occupant's hand.

The controller 250 may determine whether the occupant's hand motion is a system initiation motion (408).

The system initiation motion may be a screen display motion for displaying the menu screen on the image display device 230. For example, the system initiation motion may be a single finger extension motion of the occupant.

When the occupant's hand motion is the system initiation motion (Yes in operation 408), the controller 250 may control the image display device 230 to display the menu screen (410).

The controller 250 may estimate a pointing position of the occupant's finger on the menu screen (412).

The controller 250 may recognize a pointing menu (e.g., a menu item, a user interface element, etc.) among a plurality of menus (e.g., a plurality of menu items, a plurality of user interface elements, etc.) based on the pointing position (414).

Figure 9:
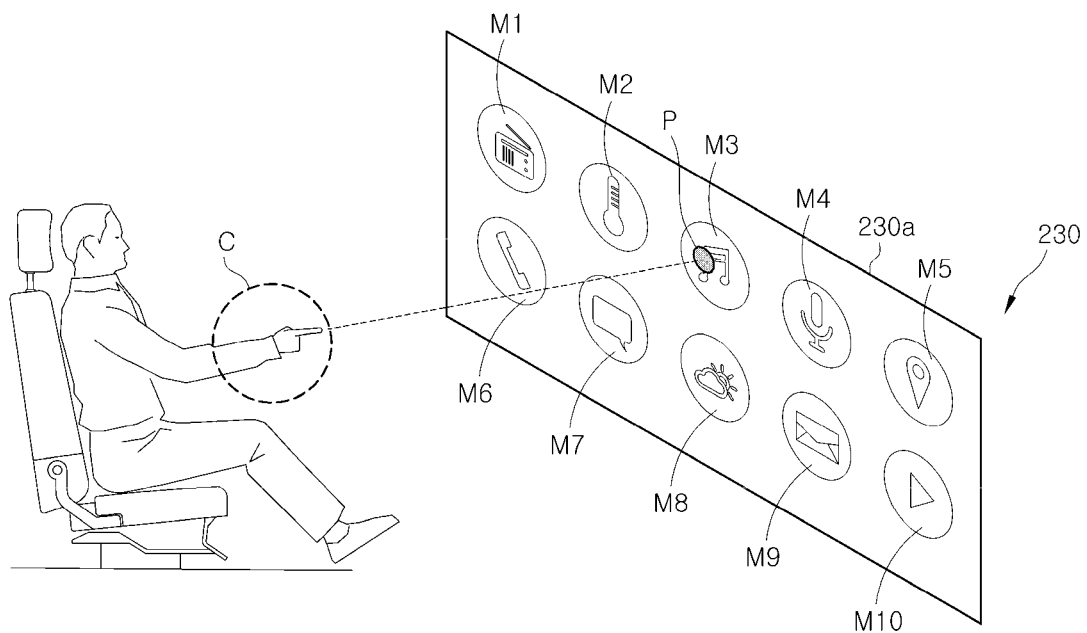
FIG. 9 is a diagram illustrating an example where an occupant's hand points to a desired menu on a menu screen in a vehicle.

FIG. 9 is a diagram illustrating an example where an occupant's hand points to a desired menu on a menu screen in a vehicle.

Referring to FIG. 9, the controller 250 may generate an extension line (refer to a dotted line in FIG. 9) extending from an occupant's fingertip to a menu screen 230A of the image display device 230 using a skeleton of the occupant's hand. In this instance, the controller 250 may generate the extension line extending from the tip of the occupant's extended finger to the menu screen 230A of the image display device 230 using the skeleton of the occupant's hand.

The controller 250 may determine an intersection where the extension line and a plane on which the menu screen 230A is located interest.

The controller 250 may estimate a pointing position of the occupant's hand on the menu screen 230A from coordinates of the intersection. That is, a position of the intersection may be estimated as the pointing position. The pointing position to which the occupant's hand is pointing on the menu screen may be estimated from the coordinates of the intersection of the extension line and the plane of the menu screen 230A.

Assuming that the tip of the occupant's extended finger extends to the menu screen 230A, an intersection of the extended fingertip and the menu screen 230A may be estimated as the pointing position of the occupant's finger. A menu corresponding to the pointing position may be recognized as the pointing menu. In this instance, it may be assumed that a line connecting a wrist (or hand center) and the extended fingertip extends to the menu screen 230A using the skeleton of the occupant's hand.

When the occupant extends the occupant's finger, an orientation of the skeleton from the wrist (or hand center) to the finger is close to an occupant's intention.

For example, the menu screen 230 may include a plurality of menus M1 to M10 arranged regularly. The plurality of menus M1 to M10 may be related to television M1, temperature M2, music M3, microphone M4, navigation M5, call M6, text M7, weather M8, mail M9, video M10, and the like. In addition, the plurality of menus M1 to M10 may be menus related to seating devices, lighting devices, and advanced driver assistance systems (ADAS). For example, the ADAS may include functions such as an adaptive cruise control (ACC), an intelligent speed limit assist (ISLA), a forward collision avoidance (FCA), an autonomous emergency braking (AEB), a lane departure warning (LDW), a lane keeping assist (LKA), a lane following assist (LFA), a high beam assist (HBA), a traffic sign recognition (TSR), a blind spot detection (BSD), a smart cruise control (SCC), a tire pressure monitoring system (TPMS), and the like.

As shown in FIG. 9, it may be seen that the extended finger in an occupant's hand region C points to the pointing position P on the menu screen 230A. The intersection P of the occupant's extended fingertip and the plane of the menu screen may be confirmed, and the pointing position P on the menu screen 230A may be estimated from the coordinates of the intersection. Among the plurality of menus M1 to M10 of the menu screen 230A, the music M3, which is a menu corresponding to the pointing position P, may be recognized as the pointing menu.

Referring again to FIG. 7, the controller 250 may enlarge the pointing menu (416).

Figure 10:
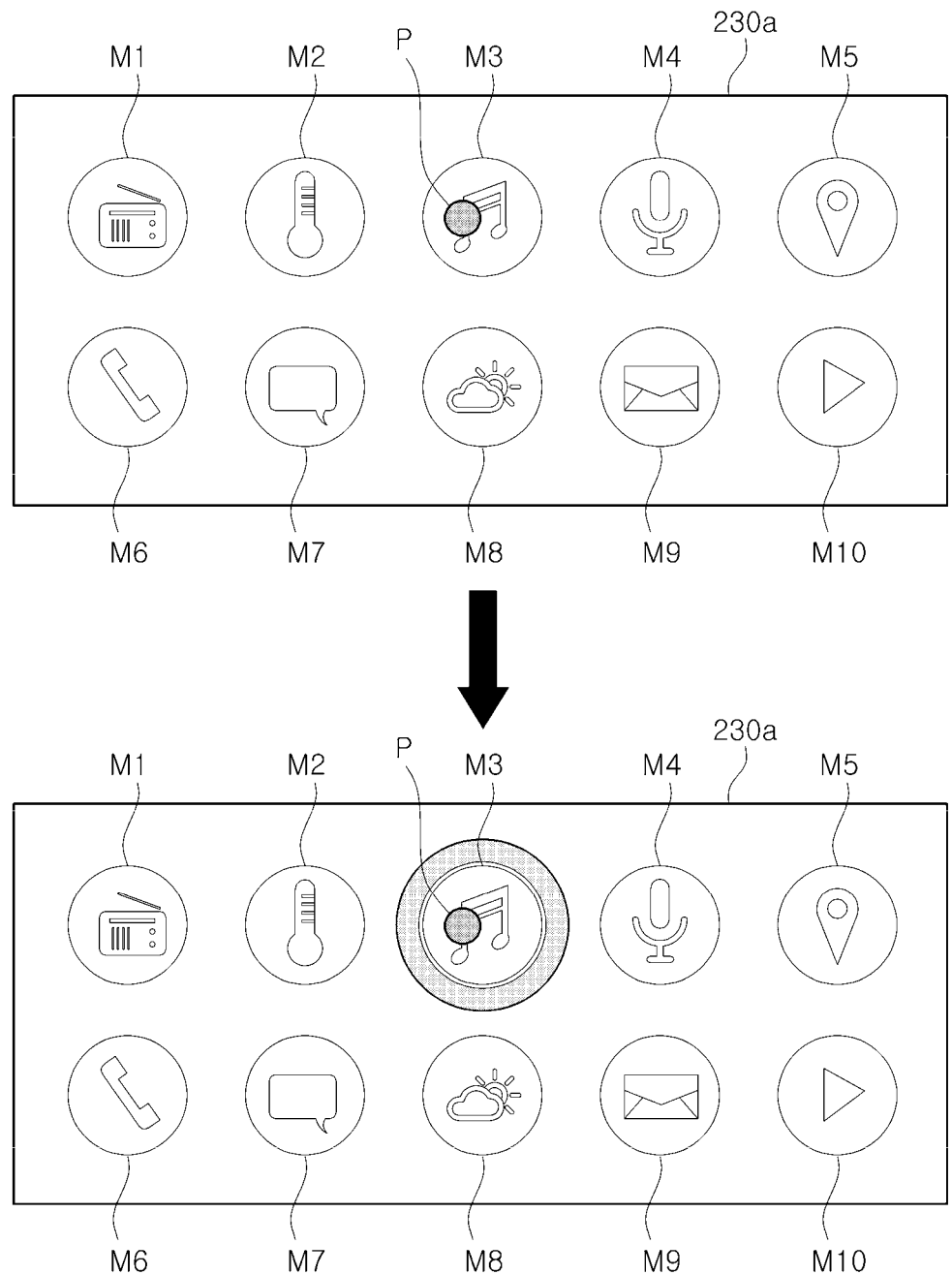
FIG. 10 is a diagram illustrating an example of displaying a pointing menu pointed to by an occupant's hand so that an occupant may recognize the pointing menu in a vehicle.

FIG. 10 is a diagram illustrating an example of displaying a pointing menu pointed to by an occupant's hand so that an occupant may recognize the pointing menu in a vehicle.

Referring to FIG. 10, the controller 250 may enlarge or highlight the pointing menu in comparison to other menus.

Also, the controller 250 may both enlarge and highlight the pointing menu so that the occupant may recognize the pointing menu.

For example, by both enlarging and highlighting the music M3, which is the pointing menu corresponding to the pointing position P, the occupant may recognize which menu is the pointing menu.

Meanwhile, when the occupant moves occupant's finger, the pointing position moves with the movement of the occupant's finger. The pointing menu corresponding to the moved pointing position changes. For example, when the occupant moves the occupant's finger to the left, the pointing position moves to the left, and thus a pointing menu that is enlarged or highlighted also changes in an order of temperature M2 and television M1.

Referring again to FIG. 7, when the pointing menu is recognized, the controller 250 may activate a stereo microphone (418).

The controller 250 may activate the stereo microphone to recognize an occupant's voice in a state where the pointing menu is enlarged or highlighted.

The controller 250 may determine a difference in sound pressure levels (decibels) between microphones of the stereo microphone (420).

The controller 250 may determine whether the sound pressure level difference between the microphones is equal to or greater than a preset level (e.g., a threshold sound pressure level) (422).

When the sound pressure level difference is equal to or greater than the preset level (Yes in operation 420), the controller 250 may execute the pointing menu (424).

Figure 11:
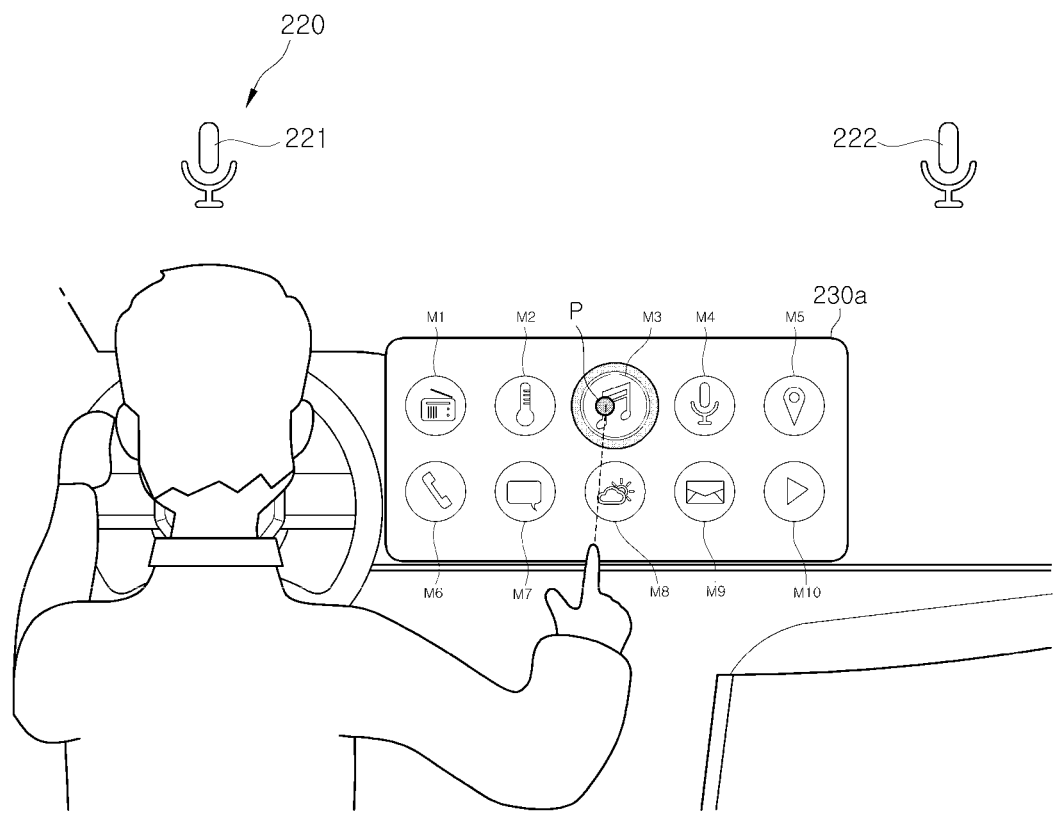
FIG. 11 is a diagram illustrating recognition of a voice input through a stereo microphone in a vehicle.

FIG. 11 is a diagram illustrating recognition of a voice input through a stereo microphone in a vehicle.

Referring to FIG. 11, the controller 250 may activate the stereo microphones 221 and 222 in a state where the music M3, which is a pointing menu from among a plurality of menus M1 to M10, is enlarged and highlighted on the menu screen 230A of the image display device 230, so that an occupant may recognize that the pointing menu has been selected.

The stereo microphones 221 and 222 may include the first stereo microphone 221 and the second stereo microphone 222. The first stereo microphone 221 and the second stereo microphone 222 may be provided at different positions. The first stereo microphone 221 may be directed at an occupant to receive a voice of the occupant, and the second stereo microphone 222 may be a microphone provided to receive a voice inside the vehicle 1.

The controller 250 may execute the pointing menu, when a difference between a sound pressure level of a voice signal received in the first stereo microphone 221 and a sound pressure level of a voice signal received in the second stereo microphone 222 is higher than a preset level. In this instance, when the sound pressure level difference is higher than the preset level, the controller 250 may determine that a voice command to execute the pointing menu is input and execute the pointing menu.

In order to improve response efficiency which is a limitation of hand motion recognition, the vehicle 1 may execute the pointing menu, when a sound or voice above a predetermined sound pressure level is input with the pointing menu selected. Through the above, the pointing menu may be executed without a time delay that requires the occupant to maintain a current hand motion for a predetermined period of time to confirm the current hand motion. In this instance, the menu may be executed simply by a sound or voice above the predetermined sound pressure level, and thus additional processes of recognizing voice and converting into text may be eliminated and real-time responsiveness may be improved.

By using the two-channel stereo microphones 221 and 222 including the first microphone 221 which is a directional microphone toward an occupant to prevent malfunction due to internal or external noise that may occur in the vehicle 1 and the second microphone 222 receiving a sum of the noise in the vehicle 1, when a sound pressure level difference between voices of the two channels is equal to or greater than a predetermined sound pressure level, it may be determined that voice has been input, thereby implementing a system robust to internal or external noise in the vehicle 1.

When the pointing menu, music M3, is enlarged on the menu screen 230A, the occupant may execute the pointing menu by saying a simple word such as "operate", "on", or the like, or by generating a sound above a predetermined decibel if unable to speak. In this case, by using a speech recognition operation method that does not interpret the meaning of words, but recognizes a voice signal distinguished from sound waves formed in a current noise environment, reliable speech recognition accuracy may be achieved even in vehicle vibration and noise.

Afterwards, when the occupant makes a system shutdown motion such as folding the occupant's fingers, a speech recognition system may be shut down with the current pointing menu running. For the running pointing menu, sub-functions such as playing a song desired by the occupant from a music list, and the like, may be performed through voice recognition.

The vehicle 1 may include a two-channel stereo microphone to recognize a speaker's voice above a predetermined sound pressure level, significantly distinguished by comparing the speaker's voice with a sum of entire noise of the vehicle, rather than noise canceling. When a single microphone, a one-channel microphone, is applied, a voice at a time of utterance may be compared to a voice immediately before the time of utterance, thereby recognizing the speaker's voice above the sound pressure level and/or amplitude distinguished from noise in the vehicle.

Hereinafter, a vehicle to which a single microphone is applied is described.

Figure 12:
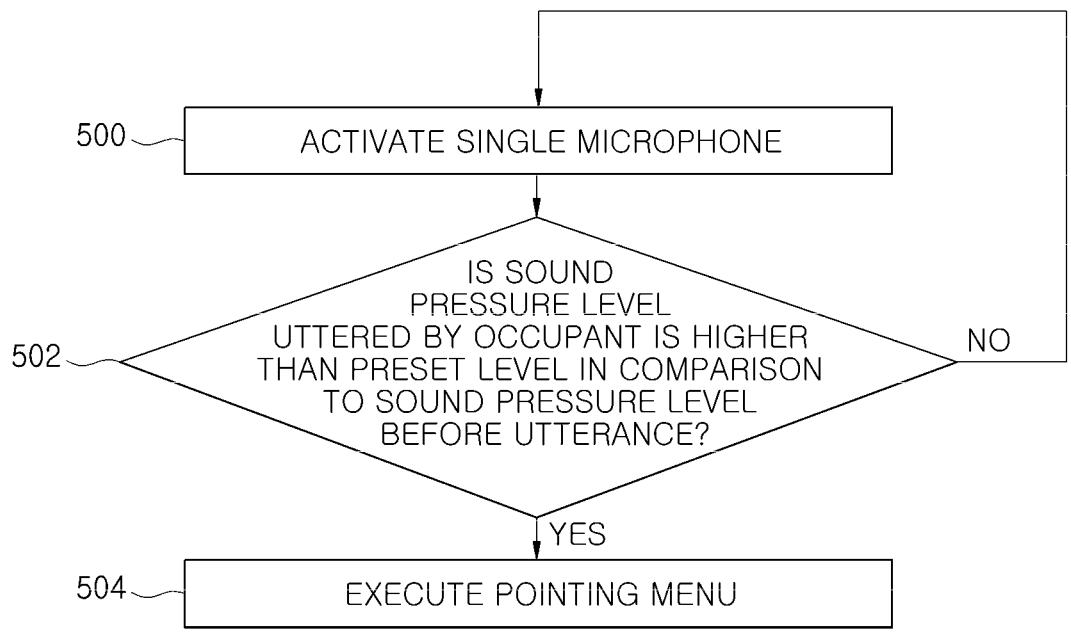
FIG. 12 is a flowchart illustrating another example of voice recognition in a vehicle.

FIG. 12 is a flowchart illustrating another example of voice recognition in a vehicle.

Referring to FIG. 12, when a pointing menu is recognized on the menu screen 230A, the controller 250 may activate a single microphone (500).

The controller 250 may activate the single microphone to recognize an occupant's voice in a state where the pointing menu is enlarged or highlighted.

The controller 250 may determine whether a sound pressure level of a voice signal uttered by the occupant is higher than a preset level in comparison to a sound pressure level of a voice signal before utterance based on a point in time of the occupant's utterance (502).

When an amplitude of the voice signal uttered by the occupant is higher than a preset amplitude in comparison to an amplitude of the voice signal before utterance (Yes in operation 502), the controller 250 may determine that the occupant's voice is input and execute the pointing menu (504).

For a vehicle not equipped with a two-channel stereo microphone, a single microphone may be applied. A sound pressure level and/or wavelength of a voice signal at the time of utterance may be different from or higher than that of a voice signal before utterance.

In general, a sound pressure level increases at the time of utterance compared to a current noise level in the vehicle. In addition, whether a voice is input may be determined by comparing the amplitude width before and after the utterance through a waveform of sound wave. Accordingly, an input sound may be distinguished without noise removal and in a simpler manner than an existing method of noise canceling using opposite sound waves.

The vehicle 1 may allow an occupant to select a pointing menu on a projection image of the image projector 232 or the display 231 by an occupant's hand motion and execute the pointing menu by simple voice recognition. Therefore, the occupant may quickly select the pointing menu simply by pointing to a desired menu on the menu screen through an occupant's hand motion, and the pointing menu may be executed by a simple word or sound that does not require a determination of meaning of words, and thus errors in voice recognition due to dialects, accents, and the like, may be prevented.

As is apparent from the above, the vehicle and the control method thereof can use a hybrid interface method combining hand motion recognition and voice recognition based on a hand gesture and voice of an occupant of the vehicle, thereby performing a function desired by the occupant quickly and accurately Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The one or more example embodiments may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SSD), a silicon disk drive (SDD), a read-only memory (ROM), a compact disc read only memory (CD-ROM), a magnetic tape, a floppy disk, an optical recording medium, and the like.

What is claimed is:

1. A vehicle comprising:
    a microphone provided inside the vehicle and configured to receive a voice uttered by an occupant of the vehicle;
    a camera configured to obtain an image inside the vehicle;
    a display device configured to display a menu screen comprising a plurality of menu items; and
    a controller configured to control the display device,
    wherein the controller is further configured to:
        recognize, based on the image obtained via the camera, a hand gesture of the occupant;
        determine, based on the hand gesture, a menu item, of the plurality of menu items on the menu screen, pointed to by the occupant; and
        execute, based on the voice uttered by the occupant, a command corresponding to the pointed menu item.

2. The vehicle of claim 1, wherein the display device comprises at least one of:
    a display provided inside the vehicle and configured to display the menu screen, or
    an image projector configured to project the menu screen onto a space or an interior surface in the vehicle.

3. The vehicle of claim 1, wherein the controller is further configured to, based on a determination that the hand gesture is a screen display motion for displaying the menu screen, control the display device to display the menu screen.

4. The vehicle of claim 1, wherein the controller is configured to determine the menu item by:
    determining a position, on the menu screen, that is pointed to by the hand gesture; and
    determining the menu item, among the plurality of menu items, based on the determined position.

5. The vehicle of claim 4, wherein the controller is configured to determine the position by:
    estimating a skeletal structure of a hand of the occupant by applying feature points of the hand of the occupant to a skeletal model; and
    determining the position based on the estimated skeletal structure of the hand of the occupant.

6. The vehicle of claim 5, wherein the controller is configured to determine the position by:
    generating an extension line extending from a fingertip of the occupant to the menu screen based on the estimated skeletal structure of the hand of the occupant; and
    determining the position further based on an intersection between the extension line and a plane on which the menu screen is located.

7. The vehicle of claim 1, wherein the controller is further configured to enlarge or highlight the menu item, pointed to by the occupant, relative to other menu items of the plurality of menu items.

8. The vehicle of claim 7, wherein the controller is further configured to, based on the menu item being enlarged or highlighted, activate the microphone.

9. The vehicle of claim 1, wherein the microphone comprises:
    a first microphone configured to receive a first voice signal inside the vehicle; and
    a second microphone directed at the occupant to receive a second voice signal associated with the occupant, and
    wherein the controller is configured to execute the command by:
        executing the command based on a sound pressure level difference, between the first voice signal received via the first microphone and the second voice signal received via the second microphone, being greater than a threshold sound pressure level.

10. The vehicle of claim 1, wherein the microphone comprises a single microphone, and
    wherein the controller is configured to execute the command based on at least one of:
        a sound pressure level difference, between a first voice signal corresponding to the voice uttered by the occupant and a second voice signal received before the occupant utters the voice, being greater than a threshold sound pressure level, or
        an amplitude difference, between the first voice signal corresponding to the voice uttered by the occupant and the second voice signal received before the occupant utters the voice, being greater than a threshold amplitude.

11. A method comprising:
    obtaining, via a camera of a vehicle, an image inside the vehicle, wherein the image obtained via the camera comprises an image of an occupant of the vehicle;
    extracting, based on the image obtained via the camera, a hand region of the occupant of the vehicle;
    recognizing, based on the hand region, a hand gesture of the occupant of the vehicle;
    determining, based on the hand gesture, a menu item, of a plurality of menu items on a menu screen displayed on a display device of the vehicle, pointed to by the occupant;
    receiving a voice uttered by the occupant; and
    executing, based on the voice, a command corresponding to the pointed menu item.

12. The method of claim 11, further comprising causing the display device to perform at least one of:
    displaying the menu screen on a display provided in the vehicle, or
    displaying the menu screen onto a space in the vehicle through an image projector provided in the vehicle.

13. The method of claim 11, further comprising, based on a determination that the hand gesture is a screen display motion for displaying the menu screen, controlling the display device to display the menu screen.

14. The method of claim 11, wherein the determining of the menu item comprises:
    determining a position, on the menu screen, that is pointed to by the hand gesture; and
    determining the menu item, among the plurality of menu items, based on the determined position.

15. The method of claim 14, wherein the determining of the position comprises estimating a skeletal structure of a hand of the occupant by applying feature points of the hand of the occupant to a skeletal model; and
    determining the position based on the estimated skeletal structure of the hand of the occupant.

16. The method of claim 15, wherein the determining of the position comprises:
    generating an extension line extending from a fingertip of the occupant to the menu screen based on the estimated skeletal structure of the hand of the occupant; and
    determining the position further based on an intersection between the extension line and a plane on which the menu screen is located.

17. The method of claim 11, further comprising enlarging or highlighting the menu item, pointed to by the occupant, relative to other menu items of the plurality of menu items.

18. The method of claim 17, further comprising, based on the menu item being enlarged or highlighted, activating a microphone in the vehicle.

19. The method of claim 11, wherein the receiving of the voice uttered by the occupant comprises:
- receiving a first voice signal inside the vehicle via a first microphone; and
- receiving a second voice signal associated with the occupant via a second microphone directed at the occupant, and
- wherein the executing of the command comprises executing the command based on a sound pressure level difference, between the first voice signal received via the first microphone and the second voice signal received via the second microphone, being greater than a threshold sound pressure level.

20. The method of claim 11, wherein the executing of the command comprises executing the command based on at least one of:
- a sound pressure level difference, between a first voice signal corresponding to the voice uttered by the occupant and a second voice signal received before the occupant utters the voice, being greater than a threshold sound pressure level, or
- an amplitude difference, between the first voice signal corresponding to the voice uttered by the occupant and the second voice signal received before the occupant utters the voice, being greater than a threshold amplitude.

* * * * *